United States Patent
Maki et al.

(10) Patent No.: US 8,940,177 B2
(45) Date of Patent: Jan. 27, 2015

(54) METHOD OF MANUFACTURING ROLL-SHAPED MOLD AND METHOD OF MANUFACTURING PRODUCT HAVING CONCAVE-CONVEX MICROSTRUCTURE ON SURFACE THEREOF

(75) Inventors: Tokuho Maki, Hiroshima (JP); Masatoshi Kamata, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 14/126,444

(22) PCT Filed: Jun. 20, 2012

(86) PCT No.: PCT/JP2012/065711
§ 371 (c)(1),
(2), (4) Date: Dec. 16, 2013

(87) PCT Pub. No.: WO2012/176794
PCT Pub. Date: Dec. 27, 2012

(65) Prior Publication Data
US 2014/0110371 A1  Apr. 24, 2014

(30) Foreign Application Priority Data

Jun. 22, 2011  (JP) ................. 2011-138300

(51) Int. Cl.
| | | |
|---|---|---|
| B29C 59/00 | (2006.01) | |
| B44C 1/22 | (2006.01) | |
| B29C 33/58 | (2006.01) | |
| B29C 59/04 | (2006.01) | |
| B29C 35/08 | (2006.01) | |
| B29C 33/42 | (2006.01) | |

(52) U.S. Cl.
CPC ........... *B29C 59/00* (2013.01); *B29C 33/58* (2013.01); *B29C 59/046* (2013.01); *B29C 2035/0827* (2013.01); *B29C 33/424* (2013.01)
USPC ................... 216/9; 216/11; 216/83

(58) Field of Classification Search
USPC .................................... 216/9, 11, 83
See application file for complete search history.

(56) References Cited

U.S. PATENT DOCUMENTS

| | | | | |
|---|---|---|---|---|
| 4,911,226 | A * | 3/1990 | Cleary et al. | 164/478 |
| 7,012,762 | B2 * | 3/2006 | Tseng et al. | 359/726 |

(Continued)

FOREIGN PATENT DOCUMENTS

| | | |
|---|---|---|
| JP | 08-267464 | 10/1996 |
| JP | 2008-081547 | 4/2008 |
| JP | 2010-253820 | 11/2010 |
| JP | 2011-025683 | 2/2011 |

OTHER PUBLICATIONS

"International Search Report (Form PCT/ISA/210)", mailed on Aug. 14, 2012, with English translation thereof, p. 1-p. 4, in which the listed references (JP08-267464, JP2011-025683, JP2010-253820 and JP2008-081547) were cited.

*Primary Examiner* — Shamim Ahmed
(74) *Attorney, Agent, or Firm* — Jianq Chyun IP Office

(57) ABSTRACT

A method of manufacturing a roll-shaped mold includes: an immersing step of immersing a roll-shaped mold main body into a treatment agent; a first removing step of exposing a portion of the mold main body from a liquid level of the treatment agent in which a central axis of the mold main body is inclined with respect to a horizontal surface; a second removing step in which the mold main body is moved in relation to the liquid level of the treatment agent in which a meniscus is sustained between the exposed portion of the mold main body and the liquid level of the treatment agent and thereby further exposing the mold main body; and a third removing step of removing the entire mold main body from the treatment agent in which the central axis of the mold main body is inclined with respect to the horizontal surface.

10 Claims, 3 Drawing Sheets

(56) References Cited

U.S. PATENT DOCUMENTS

| | | |
|---|---|---|
| 2007/0289945 A1* | 12/2007 | Hatanaka et al. ............... 216/83 |
| 2010/0165316 A1* | 7/2010 | Huang et al. ................... 355/67 |
| 2011/0048958 A1* | 3/2011 | Wang et al. ................... 205/206 |

* cited by examiner

# METHOD OF MANUFACTURING ROLL-SHAPED MOLD AND METHOD OF MANUFACTURING PRODUCT HAVING CONCAVE-CONVEX MICROSTRUCTURE ON SURFACE THEREOF

CROSS-REFERENCE TO RELATED APPLICATION

This application is a 371 application of an international PCT application serial no. PCT/JP2012/065711, filed on Jun. 20, 2012, which claims the priority benefit of Japan application no. 2011-138300, filed on Jun. 22, 2011. The entirety of each of the above-mentioned patent applications is hereby incorporated by reference herein and made a part of this specification.

TECHNICAL FIELD

The invention relates to a method of manufacturing a roll-shaped mold and a method of manufacturing a product having a concave-convex microstructure on its surface.

DESCRIPTION OF RELATED ART

Products having a concave-convex microstructure with a cycle of equal to or less than a visible light wavelength on their surfaces, such as optical films, exhibit an antireflection function and so on. Thus, their applicability is attracting attention. A concave-convex microstructure called a moth-eye structure, in particular, is known to exhibit an effective antireflection function since its refractive index continuously increases from the refractive index of air to the refractive index of a material.

Examples of a method of manufacturing an optical film having a concave-convex microstructure on its surface include an imprint method of transferring the concave-convex microstructure formed on a surface of a mold onto a surface of a substrate film (body to be transferred). The following method is an example of an imprint method.

Photo imprint method: in a state that ultraviolet curable resin is interposed between a roll-shaped mold and a transparent substrate film, wherein anodized alumina having a plurality of pores is formed on an outer peripheral surface of the roll-shaped mold, the ultraviolet curable resin is cured by being irradiated with an ultraviolet ray, thus forming a cured resin layer having a plurality of protruding portions obtained by inverting the pores of anodized alumina on its surface. The substrate film together with the cured resin layer is separated from the roll-shaped mold.

In addition, a method of manufacturing the roll-shaped mold used in the above-mentioned imprint method is, for example, a method of repeatedly performing the following steps: anodizing a roll-shaped aluminum substrate in an electrolyte to form the anodized alumina having a plurality of pores on an outer peripheral surface of the aluminum substrate; and expanding a diameter of the pore.

The roll-shaped mold manufactured by the above-mentioned method is usually further treated with a treatment agent in order to enhance mold releasability at the surface of the side on which the concave-convex microstructure is formed.

As a surface treatment method for a mold in order to enhance the mold releasability, the following surface treatment method for a mold, for example, is known: immersing a mold into a fluororesin-based lubrication treatment agent so as to dispose a coating layer of fluorine-based resin on the surface of the mold (see Patent Document 1, for example). According to Patent Document 1, a surface treatment is performed on a mold by moving the mold as an object to be processed up and down to immerse the mold in a treatment tank that contains a fluororesin-based lubrication treatment agent and then removing the mold therefrom.

The fluororesin-based lubrication treatment agent usually contains fluororesin that forms a coating layer and a diluent for dissolving the fluororesin. The diluent in the fluororesin-based lubrication treatment agent adhered to the surface of the mold volatilizes, thereby forming the coating layer of fluororesin on the surface of the mold.

PRIOR ART DOCUMENTS

Patent Documents

Patent Document 1: Japanese Patent Publication No. H8-267464

SUMMARY OF THE INVENTION

Technical Problems to be Solved by the Invention

In addition, in cases where the roll-shaped mold is surface-treated using the surface treatment method described in Patent Document 1 (the method in which the mold is surface-treated by being immersed in the treatment tank that accommodates the fluororesin-based lubrication treatment agent and is then removed from the treatment tank), a central axis of the roll-shaped mold is placed vertically or horizontally and the roll-shaped mold is moved up and down, for the immersion in the treatment tank and the removal from the treatment tank.

However, in the cases where the surface treatment is performed with the central axis of the roll-shaped mold being placed vertically, the following problem has occurred: from the immersed state in the fluororesin-based lubrication treatment agent to the removal therefrom takes time. Particularly in cases where the roll-shaped mold has a longer overall length, the above-mentioned problem becomes obvious. Also, it is necessary to deepen the treatment tank, and large-sized equipment is required.

In addition, when the roll-shaped mold is removed in a short time, the surface treatment becomes non-uniform, and coating unevenness is likely resulted.

Meanwhile, in the cases where the surface treatment is performed with the central axis of the roll-shaped mold being placed horizontally, compared to the cases of being placed vertically, the roll-shaped mold is capable of being removed in a short time from the immersed state in the fluororesin-based lubrication treatment agent.

However, when the roll-shaped mold is separated from a liquid level of the fluororesin-based lubrication treatment agent, droplets of the fluororesin-based lubrication treatment agent may remain at an entire lowermost part (the lowermost part based on the gravity direction) of the surface of the roll-shaped mold in the horizontal state. Compared to other regions, the regions where the droplets remain become in a state of being more thickly coated, thus causing a problem as shown in FIG. 5 that a stripe-shaped stain S occurs on a surface of a roll-shaped mold 50. In addition, FIG. 5 is a three-dimensional view of the roll-shaped mold 50 after the surface treatment with a central axis being rotated 180 degrees.

The mechanism of which a stain occurs is described as follows. Although the diluent for dissolving the fluororesin is volatile, the fluororesin itself does not volatilize. Therefore, when the diluent remaining at the lowermost part of the surface of the roll-shaped mold in the horizontal state due to surface tension has volatilized, the fluororesin in the diluent coheres together and remains at the entire lowermost part as a stain.

A transfer of the concave-convex microstructure formed on the surface of the roll-shaped mold is performed by, for example, a roll-to-roll method in a seamless manner. A feature of the roll-to-roll method lies in that the longer the overall length of the mold, the more possible it is to perform a large-area and seamless transfer, and the higher the productivity. In a transfer case using the roll-to-roll method, not a whole surface of the mold is used. In order to prevent bleeding of the resin from the mold, instead of a surface (non-transfer part 52) of an end of the mold, a surface (transfer part 53) of a central portion is used for the transfer, as shown in FIG. 5.

When the stripe-shaped stain S occurs on the surface of the roll-shaped mold 50 as shown in FIG. 5, sometimes a stain may also exist at the transfer part 53. As a result, a pattern of the stain S may be transferred onto a molded article and may become a defect of the product. Particularly in cases with the roll-shaped mold that transfers a nanometer-scale protrusion and recess structure, the above-mentioned problem becomes prominent.

Moreover, in the cases where the surface treatment is performed with the central axis of the roll-shaped mold being placed vertically, sometimes the droplets of the fluororesin-based lubrication treatment agent may also remain at an entire lowermost part (the lowermost part based on the gravity direction) of the surface of the roll-shaped mold in the vertical state, resulting in a stain caused by an unevenness in the thickness of the fluororesin coating layer. In that case, the stain occurs in a ring shape at an edge of one end of the roll-shaped mold.

However, as mentioned above, since the surface (non-transfer part) of the end of the mold is not used for the transfer, even if the stain occurs in a ring shape at the edge of the end, there is no risk that the pattern of the stain is transferred onto the molded article.

The invention has been achieved in view of the above situations, and aims to provide a method of manufacturing a roll-shaped mold and a method of manufacturing a product having a concave-convex microstructure on its surface. Even in cases of performing a surface treatment on a roll-shaped mold that has a longer overall length, by using the above-mentioned method of manufacturing a roll-shaped mold, occurrence of stains at a transfer part on a surface of the roll-shaped mold is inhibited, and the surface treatment is performed uniformly in a short time.

Technical Means for Solving the Technical Problems

The invention includes the following aspects.

(1) A method of manufacturing a roll-shaped mold, wherein the roll-shaped mold has a surface of a roll-shaped mold main body treated with a treatment agent, and the method includes: an immersing step of immersing the mold main body into the treatment agent; a first removing step of exposing a portion of the mold main body from a liquid level of the treatment agent in a state in which a central axis of the mold main body is inclined with respect to a horizontal surface; a second removing step in which the mold main body is moved in relation to the liquid level of the treatment agent in a state in which a meniscus is sustained between the exposed portion of the mold main body and the liquid level of the treatment agent and thereby further exposing the mold main body from the liquid level of the treatment agent; and a third removing step of removing the entire mold main body from the treatment agent in a state in which the central axis of the mold main body is inclined with respect to the horizontal surface; wherein the treatment agent is an organic solvent liquor, and in the third removing step, the central axis of the mold main body is inclined at 0.6° or more with respect to the horizontal surface.

(2) A method of manufacturing a roll-shaped mold, wherein the roll-shaped mold has a surface of a roll-shaped mold main body treated with a treatment agent, and the method includes: an immersing step of immersing the mold main body into the treatment agent; a first removing step of exposing a portion of the mold main body from a liquid level of the treatment agent in a state in which a central axis of the mold main body is inclined with respect to a horizontal surface; a second removing step in which the mold main body is moved in relation to the liquid level of the treatment agent in a state in which a meniscus is sustained between the exposed portion of the mold main body and the liquid level of the treatment agent and thereby further exposing the mold main body from the liquid level of the treatment agent; and a third removing step of removing the entire mold main body from the treatment agent in a state in which the central axis of the mold main body is inclined with respect to the horizontal surface; wherein the treatment agent is an aqueous solution, and in the third removing step, the central axis of the mold main body is inclined at 2° or more with respect to the horizontal surface.

(3) The method of manufacturing a roll-shaped mold as described in (1) or (2), wherein in the first removing step, the second removing step and the third removing step, the central axis of the mold main body is inclined with respect to the horizontal surface.

(4) The method of manufacturing a roll-shaped mold as described in any of (1) to (3), before the immersing step, further including a concave-convex microstructure forming step of forming a concave-convex microstructure on the surface of the mold main body.

(5) The method of manufacturing a roll-shaped mold as described in (4), wherein the concave-convex microstructure is formed by an anodization treatment.

(6) A method of manufacturing a product having a concave-convex microstructure on its surface, including a transfer step of transferring the concave-convex microstructure formed on the surface of the roll-shaped mold obtained by the method as described in (4) or (5) onto a surface of a main body of the product.

Effects of the Invention

According to the invention, a method of manufacturing a roll-shaped mold and a method of manufacturing a product having a concave-convex microstructure on its surface are provided. Even in cases of performing a surface treatment on a roll-shaped mold that has a longer overall length, by using the method of manufacturing a roll-shaped mold, occurrence of stains at a transfer part on a surface of the roll-shaped mold is inhibited, and the surface treatment is performed uniformly in a short time.

DETAILED DESCRIPTION OF DISCLOSED EMBODIMENTS

Figure 1:
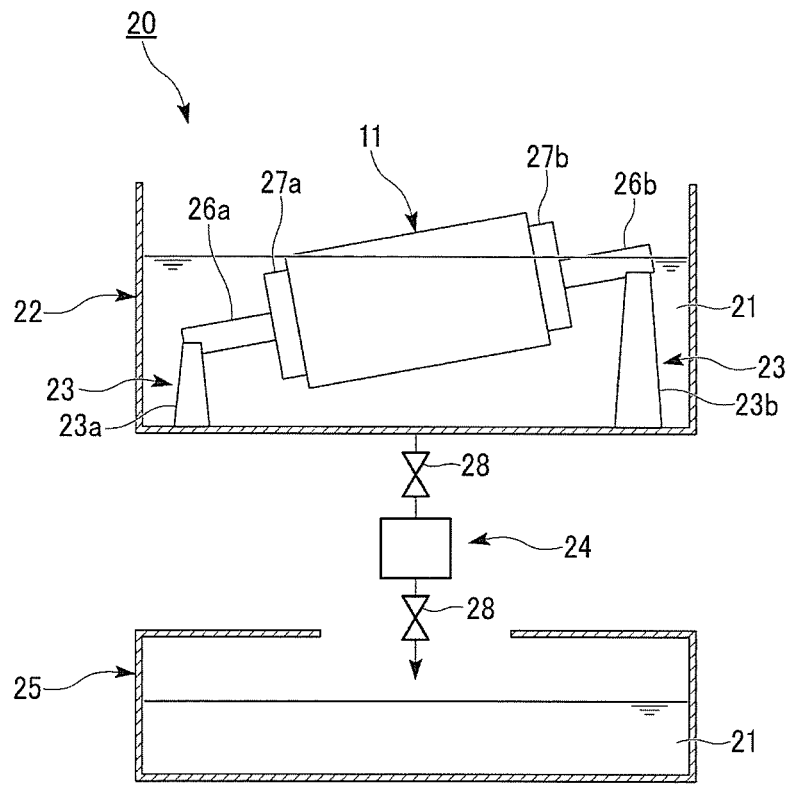
FIG. 1 is a schematic structure view of an example of a surface treatment apparatus used in the invention.

The invention is described in detail below.

In addition, in the invention, "(meth)acrylate" means "acrylate and/or methacrylate," and "(meth)acryloyl" means "methacryloyl and/or acryloyl."

The so-called "active energy ray" refers to a heat ray such as an electron beam, an ultraviolet ray, a visible ray, plasma, an infrared ray and so on.

"Method of manufacturing a roll-shaped mold"

The method of manufacturing a roll-shaped mold of the invention is a method of manufacturing a roll-shaped mold having a surface of a roll-shaped mold main body treated with a treatment agent.

The method of manufacturing a roll-shaped mold of the invention includes an immersing step, a first removing step, a second removing step and a third removing step.

The method of manufacturing a roll-shaped mold may further include, before the immersing step, a concave-convex microstructure forming step (main body manufacturing step) of forming a concave-convex microstructure on the surface of the mold main body.

Each step is described as follows. In addition, in this specification, the immersing step, the first removing step, the second removing step and the third removing step are collectively referred to as a "surface treatment step."

<Concave-Convex Microstructure Forming Step (Main Body Manufacturing Step)>

The concave-convex microstructure forming step (main body manufacturing step) is a step of manufacturing a roll-shaped mold main body, wherein the roll-shaped mold main body has a concave-convex microstructure formed on a surface of a mold substrate.

Materials of the mold substrate include materials commonly used as molds, such as pure aluminum, aluminum alloy and so on. The mold substrate is in a shape of a roll.

Methods of manufacturing the mold main body are not particularly limited, and examples thereof include a method of using interfering laser, a method of utilizing anodization (anodization treatment) and so on. Particularly, in terms of simply and easily manufacturing a seamless roll-shaped mold main body, the concave-convex microstructure is preferably formed by the following method: forming anodized alumina having a plurality of pores (recessed portions) on a surface of an aluminum substrate by anodization (porous oxide film of aluminum: alumite).

The mold main body having anodized alumina formed on its surface is manufactured by, for example, the following steps (a) to (e).

(a) a step of anodizing a roll-shaped aluminum substrate in an electrolyte at a constant voltage to form an oxide film;

(b) a step of removing at least a portion of the oxide film to form pore originating points of anodization;

(c) a step of re-anodizing the roll-shaped aluminum substrate in the electrolyte to form an oxide film having pores at the pore originating points;

(d) a step of expanding a diameter of the pores; and (e) a step of repeatedly performing the step (c) and the step (d).

Step (a):

In step (a), a roll-shaped aluminum substrate is anodized in an electrolyte at a constant voltage to form an oxide film. When the aluminum substrate is anodized, an oxide film having pores is formed.

A purity of the aluminum substrate is preferably 99% or more, more preferably 99.5% or more, and especially preferably 99.8% or more. If the purity of the aluminum substrate is low, sometimes when the aluminum substrate is anodized, a concave-convex microstructure may be formed having a size that allows visible light to be scattered due to segregation of impurities, or regularity of the pores obtained by anodization may decrease.

Examples of the electrolyte include sulfuric acid, oxalic acid, phosphoric acid and so on.

In cases where the oxalic acid is used as the electrolyte:

A concentration of the oxalic acid is preferably 0.7 M or less. When the concentration of the oxalic acid exceeds 0.7 M, sometimes the current value may become excessively high, thereby causing the surface of the oxide film to become rough.

When a formation voltage is 30 V to 60 V, anodized alumina having pores with high regularity of a cycle of 100 nm may be obtained. The regularity has a tendency to decrease no matter the formation voltage is higher or lower than the range.

A temperature of the electrolyte is preferably 60° C. or lower, and more preferably 45° C. or lower. When the temperature of the electrolyte exceeds 60° C., a phenomenon, so-called "burning", occurs, such that the pores are damaged or the regularity of the pores is broken due to melting of the surface.

In cases where the sulfuric acid is used as the electrolyte:

A concentration of the sulfuric acid is preferably 0.7 M or less. When the concentration of the sulfuric acid exceeds 0.7 M, sometimes the current value may become excessively high, thereby making it impossible to maintain the constant voltage.

When the formation voltage is 25 V to 30 V, anodized alumina having pores with high regularity of a cycle of 63 nm may be obtained. The regularity has a tendency to decrease no matter the formation voltage is higher or lower than the range.

The temperature of the electrolyte is preferably 30° C. or lower, and more preferably 20° C. or lower. When the temperature of the electrolyte exceeds 30° C., the phenomenon, so-called "burning", occurs, such that the pores are damaged or the regularity of the pores is broken due to melting of the surface.

Step (b):

In step (b), at least a portion of the oxide film formed in step (a) is removed to form pore originating points of anodization. By forming the pore originating points of anodization, the regularity of the pores is increased.

Examples of a method of removing the oxide film include a method of removing the oxide film by dissolving it in a solution that does not dissolve aluminum but selectivity dissolves the oxide film. Examples of such solution include a mixture of chromic acid and phosphoric acid and so on.

Step (c):

In step (c), the aluminum substrate having at least a portion of the oxide film removed is re-anodized in the electrolyte to form an oxide film having cylindrical pores at the pore originating points.

The anodization may be performed under the same conditions as in step (a). The more the time for anodization is extended, the deeper the pore may be acquired.

Step (d):

In step (d), a treatment (hereinafter referred to as "pore diameter expanding treatment") is performed to expand a diameter of the pores of the oxide film formed in step (c). The pore diameter expanding treatment is a treatment of expanding the diameter of the pores obtained by anodization by immersion in the solution that dissolves the oxide film. Examples of such solution include a roughly 5 mass % aqueous solution of phosphoric acid.

The more the time of the pore diameter expanding treatment is extended, the larger the pore diameter becomes.

Step (e):

In step (e), the anodization in step (c) and the pore diameter expanding treatment in step (d) are repeatedly performed. Accordingly, anodized alumina is formed having pores in a shape in which the diameter continuously decreases from an opening toward a depth direction, thus obtaining a roll-shaped mold main body having the anodized alumina on the surface of the aluminum substrate.

A number of times of repetition is preferably three or more, and more preferably five or more. If the number of times of repetition is two or fewer, there may be cases where the concave-convex microstructure manufactured by the anodized alumina having such pores has an insufficient effect of reducing reflectance since the diameter of the pores decreases discontinuously.

On the surface of the mold main body manufactured in this way, a plurality of pores (recessed portions) is concave-convex structure formed to constitute a concave-convext structure. A shape of the concave portion in the concave-convex structure is preferably a shape in which a sectional area of the concave portion in a direction orthogonal to the depth direction decreases continuously or decreases in a stair-shaped manner from the outermost surface toward the depth direction, such as a cone shape, a bell shape, a tapered shape and so on.

An average spacing between two adjacent recessed portions in the protrusion and recess structure is preferably 400 nm or less, and more preferably 250 nm or less. When the average spacing between two adjacent concave portions is larger than 400 nm, visible light is scattered. Thus, in cases where a molded body obtained by transferring the concave-convex structure using the roll-shaped mold is used as an antireflective product, sometimes transparency may be lowered.

In addition, an average depth of the recessed portions is preferably 80 nm to 500 nm, more preferably 120 nm to 400 nm, and especially preferably 150 nm to 300 nm.

<Surface Treatment Step>

The surface treatment step is a step of treating the surface of the mold main body with a treatment agent. In cases where the concave-convex microstructure forming step (main body manufacturing step) is performed before the immersing step, the surface treatment step is a step of treating the surface of the mold main body with a treatment agent, wherein the mold main body is obtained in the main body manufacturing step and the surface has the concave-convex structure formed thereon.

By performing a surface treatment on the mold main body, when the concave-convex microstructure of the roll-shaped mold is transferred, a resin material used in the transfer process is inhibited from being stuffed into the concave portions in the concave-convex microstructure. Particularly, in cases where a roll-shaped mold having a nanometer-scale concave-convex microstructure on its surface is used for transfer, it is hard to remove the resin material once it is stuffed in the concave portions. For that reason, the mold main body is surface-treated in advance.

The surface treatment step includes an immersing step, a first removing step, a second removing step and a third removing step.

In the method of the invention, the mold main body is immersed into the treatment agent, followed by removing the mold main body from the treatment agent, such that the surface of the mold main body is treated with the treatment agent. In the cases where the concave-convex microstructure forming step (main body manufacturing step) is performed before the immersing step, the mold main body obtained in the main body manufacturing step is immersed into the treatment agent, followed by removing the mold main body from the treatment agent, such that the surface of the mold main body having the concave-convex structure formed thereon is treated with a lubrication treatment agent.

Moreover, before performing the surface treatment on the mold main body, it is preferable to have the surface cleaned in advance. Particularly, in cases where stains, foreign substances or the like are adhered to the surface, it is preferable to remove these adhering substances in advance.

The surface treatment step is described in more detail as follows.

(Treatment Agent)

Examples of the treatment agent include a lubrication treatment agent, and specific examples thereof include fluorine-based resin, a phosphate compound and so on.

The treatment agent is preferably an organic solvent liquor such as a fluororesin-based lubrication treatment agent obtained by dissolving fluorine-based resin in a diluent containing an organic solvent, an aqueous solution such as a phosphate-based lubrication treatment agent obtained by dissolving a phosphate compound in water, and so on.

Examples of the fluororesin-based lubrication treatment agent include a treatment agent having a functional group (B), wherein the functional group (B) is capable of reacting with a functional group (A) existing on the surface of the mold main body.

Here, the so-called functional group (A) is a functional group existing on the surface of the mold main body, and refers to a group capable of reacting with a reactive functional group (B) contained in the fluororesin-based lubrication treatment agent and thereby forming a chemical bond.

Examples of the functional group (A) include hydroxyl group, amino group, carboxyl group, mercapto group, epoxy group, ester group and so on. In terms of good reactivity with a hydrolyzable silyl group serving as the reactive functional group (B) contained in the fluororesin-based lubrication treatment agent in most cases, hydroxyl group is especially preferable.

If the mold substrate has the functional group (A) in the first place, the functional group (A) exists on the surface of the mold main body. Moreover, in cases where the surface treated with the fluororesin-based lubrication treatment agent is anodized alumina, the functional group (A) is a hydroxyl group.

In cases where no functional group (A) exists on a surface of a side of the mold main body on which the concave-convex microstructure is formed, the functional group (A) may be introduced by the following methods (1) and (2) and so on.

Method (1): a method of introducing the functional group (A) onto the surface of the side of the mold main body on which the concave-convex microstructure is formed by performing a plasma treatment on the surface;

Method (2): a method of introducing the functional group (A) onto the surface of the side of the mold main body on which the concave-convex microstructure is formed by treating the surface using a compound (silane coupling agent, etc.) having the functional group (A) or a precursor thereof.

The so-called functional group (B) refers to a group capable of reacting with the functional group (A) and thereby forming a chemical bond, or a group capable of being easily converted into such a group.

In cases where the functional group (A) is a hydroxyl group, examples of the functional group (B) include hydrolyzable silyl group, silanol group, hydrolyzable group containing a titanium atom or an aluminum atom, and so on. In terms of good reactivity with hydroxyl group, hydrolyzable silyl group and silanol group are preferable. The so-called hydrolyzable silyl group refers to a group that generates a silanol group (Si—OH) by hydrolysis, and examples thereof include Si—OR$^1$ (R$^1$ is an alkyl group), Si—X (X is a halogen atom) and so on.

Specific examples of the fluororesin-based lubrication treatment agent include fluororesin having the functional group (B), a fluorine compound having the functional group (B), and so on. A fluorine compound having a hydrolyzable silyl group is especially preferable.

Examples of commercial products of the fluorine compound having a hydrolyzable silyl group include fluoroalkylsilane, "KBM-7803" manufactured by Shin-Etsu Chemical Co., Ltd., "Optool" series (e.g. "Optool DSX," etc.) manufactured by Daikin Industries, Ltd., "Novec EGC-1720" manufactured by Sumitomo 3M Limited, and so on. Moreover, in cases where the "Optool" series are used, "Optool DSX" may be used as a simple substance, or "Optool DSX" may be used after dilution with a diluent (e.g. "Optool HD-ZV" manufactured by Daikin Industries, Ltd.).

Meanwhile, a polyoxyethylene alkyl phosphate compound is preferably used as the phosphate compound. At least one polyoxyethylene alkyl phosphate compound represented by the following general formula (I) is especially preferable.

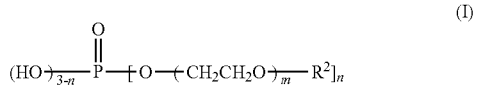
(I)

In formula (I), R$^2$ represents an alkyl group, m is 1 to 20, and n is 1 to 3.

R$^2$ is preferably a C3-18 alkyl group.

m represents an average addition mole number of an ethylene oxide, and is preferably 1 to 10.

The polyoxyethylene alkyl phosphate compound represented by the general formula (I) may be any one of a monoester, a diester or a triester. In addition, in cases where it is a diester or a triester, multiple polyoxyethylene alkyl residues in one molecule may be different from one another.

Examples of commercial products of the polyoxyethylene alkyl phosphate compound represented by the general formula (I) include "JP-506H" manufactured by Johoku Chemical Co., Ltd., "INT-1856" in MoldWiz® (registered trademark) series manufactured by Axel Plastics Research Laboratories, Inc., "TDP-10," "TDP-8," "TDP-6," "TDP-2," "DDP-10," "DDP-8," "DDP-6," "DDP-4," "DDP-2," "TLP-4," "TCP-5" and "DLP-10" (all of the above are trade names) manufactured by Nikko Chemicals Co., Ltd., and so on. One kind of these commercial products may be used alone, or two or more kinds thereof may be used in combination.

A concentration of the phosphate compound is satisfactory as long as the concentration ensures mold releasability of the mold. In the solution of the lubrication treatment agent, the concentration of the phosphate compound is preferably 0.001 mass % to 10 mass %, more preferably 0.01 mass % to 1 mass %, and further preferably 0.05 mass % to 0.5 mass %. In addition, in order to improve operability, the lubrication treatment agent may include a defoamer and so on.

(Immersion in the Treatment Agent (Immersing Step))

The immersing step is a step of immersing the mold main body into the treatment agent.

In regard to one example of the method of immersing the mold main body into the treatment agent, a description is given below with reference to FIG. 1. However, the invention is not limited to the following method.

Moreover, the immersing step and the first to third removing steps described below illustrate a case where the lubrication treatment agent is used as the treatment agent.

FIG. 1 is a schematic structure view of an example of a surface treatment apparatus used in the invention. A surface treatment apparatus 20 in this example includes: a treatment tank 22, accommodating a lubrication treatment agent 21; an inclination mechanism 23 disposed inside the treatment tank 22, inclining a mold main body 11 while supporting the mold main body 11; a liquid drawing means 24, drawing the lubrication treatment agent 21 from a bottom of the treatment tank 22; and a receiving tank 25, receiving the lubrication treatment agent 21 drawn from the treatment tank 22.

The treatment tank 22 in this example is provided with an outer tank (illustration omitted) adjacent to a periphery thereof, wherein the outer tank has a moat-like structure and may receive the lubrication treatment agent 21 flowing over from the treatment tank 22. Furthermore, the outer tank and the treatment tank 22 are connected by piping, and the lubrication treatment agent 21 accumulating in the outer tank may be supplied to the treatment tank 22 via a circulator pump (illustration omitted).

The inclination mechanism 23 includes a pair of support members 23a and 23b for installation of shafts 26a and 26b. Heights of the support member 23a and the support member 23b may be adjusted separately so as to adjust an inclination angle of a central axis of the mold main body 11.

On one end of each of the shafts 26a and 26b, installation members 27a and 27b for installing the shafts 26a and 26b onto the mold main body 11 are respectively provided.

A method of arranging the mold main body 11 in the surface treatment apparatus 20 is not particularly limited. For example, the shafts 26a and 26b are installed onto two ends of the mold main body 11 via the installation members 27a and 27b, and the inclination angle (an angle formed by the central axis and the horizontal surface) of the mold main body 11 is adjusted. Then, the shafts 26a and 26b are installed onto the support members 23a and 23b of which the heights have been adjusted in advance, so as to set the mold main body 11 on the inclination mechanism 23. At this moment, the lubrication treatment agent 21 is not supplied in the treatment tank 22.

After the mold main body 11 is set on the inclination mechanism 23, the lubrication treatment agent 21 is supplied into the treatment tank 22 so as to immerse the mold main body 11 into the lubrication treatment agent 21.

In regard to the supply of the lubrication treatment agent 21, first, the lubrication treatment agent 21 is supplied to the outer tank (illustration omitted), and is then supplied to the treatment tank 22 by using the circulator pump (illustration omitted) from the outer tank toward the treatment tank 22. The lubrication treatment agent 21 is preferably supplied from the bottom of the treatment tank 22.

In addition, when the lubrication treatment agent 21 is supplied from the outer tank, a cover may be placed over the treatment tank 22. By placing the cover, spattering to the surface of the mold main body 11 that accompanies the supply of the lubrication treatment agent 21 is prevented, so that stains resulting on the surface of the mold are suppressed.

When the lubrication treatment agent 21 is continuously supplied from the outer tank to the treatment tank 22 using the circulator pump, the lubrication treatment agent 21 flows over (overflow) from the treatment tank 22 into the outer tank, and is again supplied from the outer tank to the treatment tank 22 via the circulator pump. Accordingly, the outer tank functions as a receiving tank for the overflow and as a buffer tank for supplying the lubrication treatment agent 21 to the treatment tank 22.

In addition, when the lubrication treatment agent 21 overflows from the treatment tank 22 to the outer tank, sometimes the foreign substances such as particles and trash originating from members (treatment tank 22, piping, etc.) of the surface treatment apparatus 20, the lubrication treatment agent 21 and the mold main body 11 may also be brought to the outer tank.

Accordingly, when the lubrication treatment agent 21 is supplied from the outer tank, it is preferable that the lubrication treatment agent 21 is supplied to the treatment tank 22 after undergoing filtration by passing through a filter (illustration omitted). By performing the filtration, the foreign substances are removed so that a clean lubrication treatment agent 21 is supplied to the treatment tank 22.

In addition, by causing the overflow of the lubrication treatment agent 21, an effect that the foreign substances floating on the liquid level are removed from the treatment tank 22 is obtained. Particularly, in most cases, the foreign substances floating on the liquid level are adhered to the surface of the mold when the mold is dried after the surface treatment step, and particularly in cases with the mold for transferring a nanometer-scale concave-convex structure, the foreign substances on the surface of the mold becomes a prominent problem.

From such point of view, it is expected that members in contact with the lubrication treatment agent 21, such as a liquid receiving portion of the circulator pump as well as piping, tanks, jigs and so on, are made of materials that are less likely to produce foreign substances. Materials having solvent resistance are preferable. Specifically, metals, such as stainless steel (SUS), aluminum, copper and so on or fluorine-based resin, are suitable.

In addition, for the same reason, the circulator pump preferably has fewer occurrences of particles caused by a sliding portion.

The filter preferably has a very small pore diameter in order to filter the foreign substances. The filter pores have a pore diameter of preferably 0.45 µm or less, and more preferably 0.2 µm or less.

To suppress volatilization from the treatment tank 22, an immersion temperature at which the mold main body 11 is immersed into the lubrication treatment agent 21 is preferably at 0° C. or higher and 50° C. or lower.

In addition, the immersion time is not particularly limited. For example, in cases where the aforementioned "Optool" series manufactured by Daikin Industries, Ltd. are used as the lubrication treatment agent 21, the immersion time is preferably 5 minutes or more.

Moreover, the method of immersing the mold main body into the lubrication treatment agent is not limited to the above method. For example, the inclination angle of the mold main body 11 may be adjusted by separately adjusting the heights of the support members 23a and 23b after installing the mold main body 11 with the shafts 26a and 26b installed thereto onto the support members 23a and 23b. In that case, the adjustment of the inclination angle may be performed before the lubrication treatment agent 21 is supplied to the treatment tank 22 or after the supplying step (for example, at the time of removing the mold main body 11 from the lubrication treatment agent 21).

In addition, in the above-mentioned method, the lubrication treatment agent 21 is supplied to the treatment tank 22 after the mold main body 11 is set on the inclination mechanism 23 in the surface treatment apparatus 20. Nonetheless, the mold main body 11 may also be set on the inclination mechanism 23 in a state in which the lubrication treatment agent 21 is contained in the treatment tank 22.

(Removal from the Treatment Agent (First Removing Step to Third Removing Step))

Removal of the mold main body from the treatment agent is achieved by going through the first removing step, the second removing step and the third removing step in sequence.

The first removing step is a step of exposing a portion of the mold main body from a liquid level of the lubrication treatment agent in a state in which the central axis of the mold main body is inclined with respect to the horizontal surface.

In the first removing step, it is preferable that at least a portion of an uppermost part (the uppermost part based on a gravity direction) of a peripheral surface of the mold main body when the central axis of the mold main body is horizontal is exposed from the liquid level of the lubrication treatment agent, and it is more preferable that the entire uppermost part is exposed from the liquid level of the lubrication treatment agent.

In regard to the inclination angle of the mold main body in the first removing step, i.e. the angle formed by the central axis of the mold main body and the horizontal surface, it is not particularly limited. In cases where the lubrication treatment agent is an organic solvent liquor, it is preferable that the central axis of the mold main body is inclined at 0.6° or more with respect to the horizontal surface. If the inclination angle is 0.6° or more, when the mold main body is separated from the liquid level of the lubrication treatment agent, residual liquid is likely to converge at a place on a surface of an end of the mold main body. Details thereof will be described later. This effectively prevents the formation of stains at a transfer part 13 shown in FIG. 2.

In the cases where the lubrication treatment agent is an organic solvent liquor, an upper limit value of the inclination angle is not particularly limited. As the overall length of the mold main body gets longer, it is preferable that the inclination angle is as small as possible. For example, the inclination angle is preferably 45° or less, more preferably 10° or less, and further preferably 5° or less. If the inclination angle is 45° or less, a liquid volume of the lubrication treatment agent required for immersing the mold main body in a state in which the mold main body is inclined may be reduced.

Meanwhile, in cases where the lubrication treatment agent is an aqueous solution, it is preferable that the central axis of the mold main body is inclined at 2° or more with respect to the horizontal surface. If the inclination angle is 2° or more, when the mold main body is separated from the liquid level of the lubrication treatment agent, residual liquid is likely to converge at a place on a surface of an end of the mold main body. This effectively prevents the formation of stains at the transfer part 13 shown in FIG. 2.

In the cases where the lubrication treatment agent is an aqueous solution, the upper limit value of the inclination angle is not particularly limited. As the overall length of the mold main body gets longer, it is preferable that the inclination angle is as small as possible. For example, the inclination angle is preferably 45° or less, more preferably 10° or less, and further preferably 5° or less. If the inclination angle is 45° or less, the liquid volume of the lubrication treatment agent required for immersing the mold main body in the state in which the mold main body is inclined may be reduced.

The second removing step is a step as follows: moving the mold main body in relation to the liquid level of the lubrication treatment agent in a state in which a meniscus is sustained between the exposed portion of the mold main body exposed from the liquid level of the lubrication treatment agent and the liquid level of the lubrication treatment agent and thereby further exposing the mold main body from the liquid level of the lubrication treatment agent.

In the second removing step, it is preferable that the mold main body is exposed from the liquid level of the lubrication treatment agent before a lowermost part (the lowermost part based on the gravity direction) of the peripheral surface of the mold main body is about to be exposed from the liquid level of the lubrication treatment agent, wherein the lowermost part is the lowest portion of the peripheral surface of the mold main body when the center axis of the mold main body is horizontal.

Here, the so-called "meniscus" refers to the liquid level of the lubrication treatment agent that is curved in a concave shape, which is formed by the surface of the mold main body and the lubrication treatment agent in contact with the surface.

If the mold main body is moved in relation to the liquid level of the lubrication treatment agent in the state in which the meniscus is sustained, the lubrication treatment agent is uniformly adhered to the surface of the mold main body while the surface starts to dry out from a portion at which the lubrication treatment agent leaves the mold main body, thereby obtaining a uniformly surface-treated roll-shaped mold.

Examples of a method of moving the mold main body in relation to the liquid level of the lubrication treatment agent include: a method of drawing the lubrication treatment agent from the treatment tank in a state in which the inclined mold main body is fixed; a method of moving the inclined mold main body directly in an upward vertical direction so as to draw it out of the lubrication treatment agent; a method of moving the inclined mold main body directly in the upward vertical direction while drawing the lubrication treatment agent from the treatment tank, and so on. Among these methods, in terms of stably maintaining the state of the meniscus and of simplifying the surface treatment apparatus, the method of drawing the lubrication treatment agent from the treatment tank in the state in which the inclined mold main body is fixed is preferred.

In the second removing step, the mold main body is moved in relation to the liquid level of the lubrication treatment agent at a speed in a range of maintaining the meniscus. In the second removing step, if the mold main body is moved in relation to the liquid level of the lubrication treatment agent at a speed that does not maintain the meniscus, the surface treatment becomes non-uniform. Consequently, there is residual liquid on the surface of the mold main body due to breakup of the meniscus, and the residual liquid coheres together to form a stain.

Here, the so-called "the meniscus is broken" means that there are droplets and so on, which are separated from the meniscus and visible on the surface of the mold main body, on a surface of the transfer part of the mold main body. Meanwhile, the so-called "state in which the meniscus is sustained" refers to a state in which there are no visible droplets at the transfer part of the mold main body drawn from the liquid level of the lubrication treatment agent.

In this way, whether or not the meniscus is sustained is mainly determined by a relative movement speed of the mold main body to the liquid level of the lubrication treatment agent, and additionally determined by the material of the mold substrate, the type of the lubrication treatment agent and so on. In addition, the relative movement speed is determined by the later-described inclination angle of the mold main body. For example, in cases where the inclination angles are the same, the slower the relative movement speed is, the easier for sustaining the meniscus. In addition, the smaller the inclination angle is, the more possible it is to sustain the meniscus while increasing the relative movement speed.

In the cases where an organic solvent liquor such as a fluororesin-based lubrication treatment agent is used as the lubrication treatment agent, the relative movement speed is preferably 0.03 mm/s to 0.3 mm/s.

In the cases where an aqueous solution such as a phosphate-based lubrication treatment agent is used as the lubrication treatment agent, the relative movement speed is preferably 0.001 mm/s to 0.05 mm/s.

In the second removing step, the inclination angle of the mold main body is not particularly limited, and is preferably set to be the same as the inclination angle in the first removing step.

The third removing step is a step of removing the entire mold main body from the lubrication treatment agent in a state in which the central axis of the mold main body is inclined with respect to the horizontal surface.

In the cases where the lubrication treatment agent is an organic solvent liquor, in the third removing step, the central axis of the mold main body is inclined at 0.6° or more with respect to the horizontal surface. If the inclination angle is 0.6° or more, when the mold main body is separated from the liquid level of the lubrication treatment agent, residual liquid is likely to converge at a place on a surface of an end of the mold main body. This effectively prevents the formation of stains at the transfer part 13 shown in FIG. 2.

In the cases where the lubrication treatment agent is an organic solvent liquor, the upper limit value of the inclination angle is not particularly limited. In terms of simplifying equipments at the time of removal or of saving space, as the overall length of the mold main body gets longer, it is preferable that the inclination angle is as small as possible. For example, the inclination angle is preferably 45° or less, more preferably 10° or less, and further preferably 5° or less.

Meanwhile, in the cases where the lubrication treatment agent is an aqueous solution, the central axis of the mold main body is inclined at 2° or more with respect to the horizontal surface. If the inclination angle is 2° or more, when the mold main body is separated from the liquid level of the lubrication treatment agent, residual liquid is likely to converge at a place on a surface of an end of the mold main body. This effectively prevents the formation of stains at the transfer part 13 shown in FIG. 2.

In the cases where the lubrication treatment agent is an aqueous solution, the upper limit value of the inclination angle is not particularly limited. In terms of simplifying equipments at the time of removal or of saving space, as the overall length of the mold main body gets longer, it is preferable that the inclination angle is as small as possible. For example, the inclination angle is preferably 45° or less, more preferably 10° or less, and further preferably 5° or less.

Figure 2:
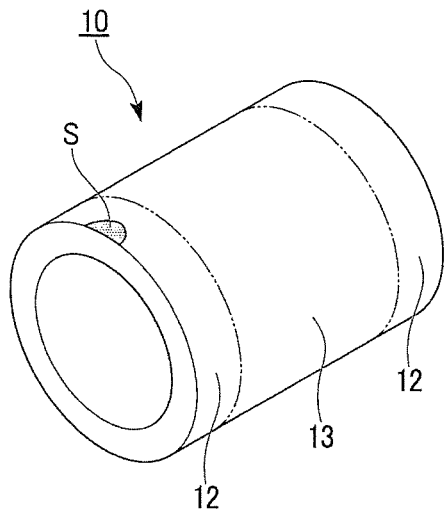
FIG. 2 schematically illustrates a three-dimensional view of an example of a roll-shaped mold obtained by the invention.

When the mold main body is removed from the lubrication treatment agent by going through the first removing step, the second removing step and the third removing step in sequence, since the mold main body is inclined, when the mold main body is separated from the liquid level of the lubrication treatment agent, the residual liquid converges at a place on the surface of an end of the mold main body (i.e. the last portion in contact with the lubrication treatment agent). Therefore, as shown in FIG. 2, the formation of the stain S due to the residual liquid is present on the surface (non-transfer part 12) of the end of the roll-shaped mold 10, thereby preventing the formation of stains at the surface (transfer part 13) of a central portion. As described above, in a roll-to-roll transfer, the surface (transfer part 13) of the central portion of the roll-shaped mold 10 is used for the transfer, while the surface (non-transfer part 12) of the end is not used for the transfer. Thus, even if the stain S occurs at the non-transfer part 12, there is no risk that a pattern of the stain is transferred onto a molded article.

In addition, FIG. 2 illustrates a three-dimensional view of an example of the roll-shaped mold 10 obtained by the invention with a central axis being rotated 180 degrees.

In the first removing step, the second removing step and the third removing step, it is preferable that the central axis of the mold main body is inclined with respect to the horizontal surface. If the central axis of the mold main body is inclined with respect to the horizontal surface in all the removing steps, the following situation may be prevented: when the central axis of the mold main body becomes horizontal, the liquid of the lubrication treatment agent remains at the uppermost part of the peripheral surface of the mold main body and thus results in liquid dripping; the droplets of the lubrication treatment agent remain at the transfer part 13 and thus result in stains and so on; when the central axis of the mold main body has become horizontal, there are stripe-shaped stains at the lowermost part of the peripheral surface of the mold main body, and so on.

In addition, in the first removing step, the second removing step and the third removing step, it is preferable that the mold main body is moved in relation to the liquid level of the lubrication treatment agent in the state in which a meniscus is sustained between the surface of the mold main body and the liquid level of the lubrication treatment agent. If the mold main body is moved in relation to the liquid level of the lubrication treatment agent in the state in which a meniscus is sustained in all the removing steps, the presence of the residual liquid at uppermost part of the peripheral surface of the mold main body, and the formation of the stains at the transfer part 13 or the lowermost part of the peripheral surface of the mold main body may be effectively prevented.

Accordingly, in the surface treatment step, it is preferable that after the mold main body is immersed into the lubrication treatment agent, in the state in which the central axis of the mold main body is inclined with respect to the horizontal surface and in which a meniscus is sustained between the surface of the mold main body and the liquid level of the lubrication treatment agent, the mold main body is moved in relation to the liquid level of the lubrication treatment agent, and the mold main body is removed from the lubrication treatment agent.

Examples of a method of inclining the mold main body include a method of inclining the mold main body using the inclination mechanism 23 in the surface treatment apparatus 20 as shown in FIG. 1. In addition, the mold main body 11 may also be inclined by, for example, a method of suspending chains of different lengths to the shafts 26a and 26b from a joist or the like.

In regard to the timing of inclining the mold main body, the mold main body may be inclined when immersed into the lubrication treatment agent, or before being removed from the lubrication treatment agent. If workability is taken into consideration, it is preferable that, for example, the surface treatment apparatus 20 shown in FIG. 1 is used in advance so that the mold main body is inclined when immersed into the lubrication treatment agent. In addition, if the mold main body is inclined when immersed into the lubrication treatment agent, as long as the lubrication treatment agent is drawn from the treatment tank in the state in which a meniscus is sustained, the formation of stains at the transfer part 13 may be easily prevented, as shown in FIG. 2.

When the lubrication treatment agent is drawn from the treatment tank, the situation is like that shown in FIG. 1: the lubrication treatment agent 21 is drawn from a bottom of the treatment tank 22 via the liquid drawing means 24. The drawn lubrication treatment agent 21 is recycled in the receiving tank 25.

The liquid drawing method is not particularly limited as long as it is capable of drawing liquid in the state in which a meniscus is sustained. The method may be a natural head liquid drawing method or a constant volume liquid drawing method.

The natural head liquid drawing method is a method capable of drawing the liquid by disposing a valve 28 at the bottom of the treatment tank 22 as shown in FIG. 1, which is simply structured and low-cost. In the natural head liquid drawing method, in cases where the valve 28 has a fixed opening degree, a liquid-drawing flow rate varies depending on a height of the liquid level of the lubrication treatment agent 21. That is, when a liquid drawing operation starts, since the liquid level of the lubrication treatment agent 21 is high, the liquid pressure is high and the liquid-drawing flow rate is large (i.e. a relative speed of the mold main body 11 with respect to the liquid level of the lubrication treatment agent 21 is fast). By contrast, when the liquid drawing operation ends, since the liquid level of the lubrication treatment agent 21 is low in height, the liquid-drawing flow rate is small (i.e. the relative speed of the mold main body 11 with respect to the liquid level of the lubrication treatment agent 21 is slow). In addition, even if the liquid level of the lubrication treatment agent 21 is the same, the liquid-drawing flow rate may be changed according to the opening degree of the valve 28.

Meanwhile, constant volume liquid drawing is performed by, for example, a method of using a constant volume pump, and the pump preferably has less liquid pulsation at an entrance side of the pump. In addition, the liquid receiving portion of the pump is preferably made of a material having resistance to the lubrication treatment agent, such as Viton® (registered trademark), polytetrafluoroethene and so on.

<Other Steps>

The surface-treated mold main body may be directly used as the roll-shaped mold. After the surface treatment step, the surface-treated mold main body may be dried (drying step) according to needs.

In cases of drying the surface-treated mold main body, air drying or heat drying using a drying machine and so on may be performed.

<Effects>

In the above-described method of manufacturing a roll-shaped mold of the invention, in the surface treatment step, at least in the first removing step and the third removing step, the mold main body is removed from the lubrication treatment agent in the state in which the central axis of the mold main body is inclined with respect to the horizontal surface. Therefore, compared to the cases where the surface treatment is performed with the central axis of the roll-shaped mold being placed vertically, the mold main body is removed from the lubrication treatment agent in a short time, thus accomplishing the surface treatment in a short time.

In addition, in the method of manufacturing a roll-shaped mold of the invention, in the surface treatment step, at least in the second removing step, the mold main body is moved in relation to the liquid level of the lubrication treatment agent and the mold main body is removed from the lubrication treatment agent in the state in which a meniscus is sustained between the surface of the mold main body and the liquid level of the lubrication treatment agent. Accordingly, the occurrence of stains at the transfer part on the surface of the roll-shaped mold is inhibited, and the surface treatment is performed uniformly. Therefore, even if the concave-convex microstructure of the roll-shaped mold is transferred onto a molded article, a pattern of a stain is not transferred.

The above-mentioned method of manufacturing a roll-shaped mold is surely applicable to cases of manufacturing a roll-shaped mold having a shorter overall length, and is also applicable to cases of manufacturing a roll-shaped mold having a longer overall length. It is not necessary to deepen the treatment tank in accordance with the overall length of the mold main body as in the cases where the surface treatment is performed with the central axis of the roll-shaped mold being placed vertically.

"Method of Manufacturing Product Having Concave-Convex Microstructure on Surface Thereof"

The method of manufacturing a product having a concave-convex microstructure on its surface of the invention includes a transfer step. In the transfer step, a concave-convex microstructure is transferred onto a surface of a main body of a product, wherein the concave-convex microstructure is obtained by the method of manufacturing a roll-shaped mold including the concave-convex microstructure forming step (main body manufacturing step), and includes a plurality of pores formed on the surface of the roll-shaped mold.

On the surface of the product manufactured by transferring the concave-convex microstructure (pores) of the roll-shaped mold, an inversion structure (convex portions) of the concave-convex microstructure of the roll-shaped mold is transferred in a key-and-keyhole relationship.

Preferred examples of a method of transferring the concave-convex microstructure of the roll-shaped mold onto the surface of the main body of the product include the following method: filling an uncured active energy ray-curable resin composition between the roll-shaped mold and a transparent substrate (main body of the product), and in a state in which the active energy ray-curable resin composition is in contact with the concave-convex microstructure of the roll-shaped mold, irradiating an active energy ray to cure the active energy ray-curable resin composition, and then releasing the roll-shaped mold. Accordingly, a product having the concave-convex microstructure that contains a cured article of the active energy ray-curable resin composition formed on a surface of the transparent substrate is manufactured. The concave-convex microstructure of the resulting product becomes the inversion structure of the concave-convex microstructure of the roll-shaped mold.

<Main Body of Product>

As the transparent substrate, one that does not remarkably obstruct the irradiation of an active energy ray is preferable since the irradiation of the active energy ray is performed through the transparent substrate. Materials of the transparent substrate include, for example, polyester resin (polyethylene terephthalate, polybutylene terephthalate, etc.), polymethacrylate resin, polycarbonate resin, vinyl chloride resin, acrylonitrile butadiene styrene (ABS) resin, styrene resin, glass and so on.

<Active Energy Ray-Curable Resin Composition>

Compared to methods of using a thermosetting resin composition, methods of using the active energy ray-curable resin composition do not require heating or cooling after the curing, and are thus capable of transferring the concave-convex microstructure in a short time, which is favorable for mass production.

Examples of a method of filling the active energy ray-curable resin composition include: a method of rolling to fill the active energy ray-curable resin composition after supplying it between the roll-shaped mold and the transparent substrate; a method of laminating the transparent substrate on the roll-shaped mold coated with the active energy ray-curable resin composition; a method of coating the transparent substrate with the active energy ray-curable resin composition in advance before laminating it on the roll-shaped mold; and so on.

The active energy ray-curable resin composition contains a polymerization reactive compound and an active energy ray polymerization initiator. In addition to the above, the active energy ray-curable resin composition may also contain a non-reactive polymer or an active energy ray sol-gel reactive composition, and may also contain various additives such as thickener, leveling agent, ultraviolet absorber, light stabilizer, heat stabilizer, solvent, inorganic filler and so on, depending on uses.

Examples of the polymerization reactive compound include a monomer, an oligomer and a reactive polymer, which has a radically polymerizable bond and/or a cationically polymerizable bond in a molecule.

Examples of the monomer having a radically polymerizable bond include a monofunctional monomer and a polyfunctional monomer.

Examples of the monofunctional monomer having a radically polymerizable bond include a (meth)acrylate derivative (methyl(meth)acrylate, ethyl(meth)acrylate, propyl(meth)acrylate, n-butyl(meth)acrylate, i-butyl(meth)acrylate, s-butyl(meth)acrylate, t-butyl(meth)acrylate, 2-ethylhexyl(meth)acrylate, lauryl(meth)acrylate, alkyl(meth)acrylate, tridecyl(meth)acrylate, stearyl(meth)acrylate, cyclohexyl(meth)acrylate, benzyl(meth)acrylate, phenoxyethyl(meth)acrylate, isobornyl(meth)acrylate, glycidyl(meth)acrylate, tetrahydrofurfuryl(meth)acrylate, allyl(meth)acrylate, 2-hydroxyethyl(meth)acrylate, hydroxypropyl(meth)acrylate, 2-methoxyethyl(meth)acrylate, 2-ethoxyethyl(meth)acrylate, etc.), (meth)acrylic acid, (meth)acrylonitrile, a styrene derivative (styrene, α-methyl styrene, etc.), a (meth)acrylamide derivative ((meth)acrylamide, N-dimethyl(meth)acrylamide, N-diethyl(meth)acrylamide, dimethylaminopropyl(meth)acrylamide, etc.) and so on. One kind of these monomers may be used alone, or two or more kinds thereof may be used in combination.

Examples of the polyfunctional monomer having a radically polymerizable bond include a bifunctional monomer (ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentylglycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethylol tricyclodecane di(meth)acrylate, ethylene oxide-added bisphenol A di(meth)acrylate, propylene oxide-added bisphenol A di(meth)acrylate, hydroxypivalic acid neopentylglycol di(meth)acrylate, divinylbenzene, methylene bisacrylamide, etc.), a trifunctional monomer (pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate, isocyanuric acid ethylene oxide-modified tri(meth)acrylate, etc.), a tetra- or higher functional monomer (condensation reaction mixture of succinic acid/trimethylolethane/acrylic acid, dipentaerythtol hexa(meth)acrylate, dipentaerythtol penta(meth)acrylate, ditrimethylol propane tetraacrylate, tetramethylol methane tetra(meth)acrylate, etc.), bi- or higher functional urethaneacrylate, bi- or higher functional polyester acrylate, and so on. One kind of these monomers may be used alone, or two or more kinds thereof may be used in combination.

Examples of the monomer having a cationically polymerizable bond include monomers having epoxy group, oxetanyl group, oxazolyl group, vinyloxy group and so on, and the monomer having epoxy group is especially preferable.

Examples of the oligomer or reactive polymer having a radically polymerizable bond and/or a cationically polymerizable bond in a molecule include unsaturated polyesters such as a condensate of an unsaturated dicarboxylic acid and a polyalcohol, polyester (meth)acrylate, polyether (meth)acrylate, polyol(meth)acrylate, epoxy(meth)acrylate, urethane (meth)acrylate, a cationic polymerizable epoxy compound, homo- or copolymers of the aforementioned monomers having a radically polymerizable bond in a side chain.

A conventional polymerization initiator may be used as the active energy ray polymerization initiator. It is preferable to make an appropriate selection according to the type of the active energy ray used in curing the active energy ray-curable resin composition.

In cases of utilizing a photocuring reaction, examples of a photoinitiator include a carbonyl compound (benzoin, benzoin methyl ether, benzoin ethyl ether, benzoin isopropyl ether, benzoin isobutyl ether, benzil, benzophenone, p-methoxybenzophenone, 2,2-diethoxyacetophenone, α,α-dimethoxy-α-phenyl acetophenone, methylphenyl glyoxylate, ethylphenyl glyoxylate, 4,4'-bis(dimethylamino)benzophenone, 2-hydroxy-2-methyl-1-phenyl-propan-1-one, etc.), a sulfur compound (tetramethylthiuram monosulfide, tetramethylthiuram disulfide, etc.), 2,4,6-trimethylbenzoyl diphenyl phosphine oxide, benzoyl diethoxy phosphine oxide and so on. One kind of these photoinitiators may be used alone, or two or more kinds thereof may be used in combination.

In cases of utilizing an electron beam curing reaction, examples of a polymerization initiator include benzophenone, 4,4-bis(diethylamino)benzophenone, 2,4,6-trimethylbenzophenone, methyl orthobenzoyl benzoate, 4-phenylbenzophenone, t-butylanthraquinone, 2-ethylanthraquinone, thioxanthone (2,4-diethylthioxanthone, isopropylthioxanthone, 2,4-dichlorothioxanthone, etc.), acetophenone (diethoxyacetophenone, 2-hydroxy-2-methyl-1-phenylpropan-1-one, benzyldimethylketal, 1-hydroxycyclohexyl-phenylketone, 2-methyl-2-morpholino(4-thiomethylphenyl) propan-1-one, 2-benzyl-2-dimethylamino-1-(4-morpholinophenyl)butanone, etc.), benzoin ether (benzoin methyl ether, benzoin ethyl ether, benzoin isopropyl ether, benzoin isobutyl ether, etc.), acylphosphine oxide (2,4,6-trimethylbenzoyl diphenyl phosphine oxide, bis(2,6-dimethoxybenzoyl)-2,4,4-trimethylpentyl phosphine oxide, bis(2,4,6-trimethylbenzoyl)-phenyl phosphine oxide, etc.), methylbenzoyl formate, 1,7-bisacrydinylheptane, 9-phenylacrydine and so on. One kind of these polymerization initiators may be used alone, or two or more kinds thereof may be used in combination.

The content of the active energy ray polymerization initiator in the active energy ray-curable resin composition is preferably 0.1 to 10 mass parts relative to 100 mass parts of the polymerization reactive compound. When the content of the active energy ray polymerization initiator is less than 0.1 mass part, it is difficult to perform the polymerization. When the content of the active energy ray polymerization initiator exceeds 10 mass parts, sometimes the cured resin may be colored or the mechanical strength may be reduced.

Examples of the non-reactive polymer include acrylic resin, styrene-based resin, polyurethane resin, cellulosic resin, polyvinyl butyral resin, polyester resin, thermoplastic elastomer and so on.

Examples of the active energy ray sol-gel reactive composition include an alkoxysilane compound, an alkylsilicate compound and so on.

Examples of the alkoxysilane compound include a compound represented by $R^3_xSi(OR^4)_y$. $R^3$ and $R^4$ represent C1-10 alkyl groups, and x and y are integers satisfying a relation of x+y=4. Specific examples thereof include tetramethoxysilane, tetra-iso-propoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyldimethoxysilane, dimethyldiethoxysilane, trim ethylethoxysilane, trimethylmethoxysilane, trimethylpropoxysilane, trimethylbutoxysilane and so on.

Examples of the alkylsilicate compound include a compound represented by $R^5O[Si(OR^7)(OR^8)O]_zR^6$. $R^5$ to $R^8$ respectively represent C1-5 alkyl groups, and z represents an integer of 3 to 20. Specific examples thereof include methyl silicate, ethyl silicate, isopropyl silicate, n-propyl silicate, n-butyl silicate, n-pentyl silicate, acetyl silicate and so on.

<Manufacturing Apparatus>

Figure 3:
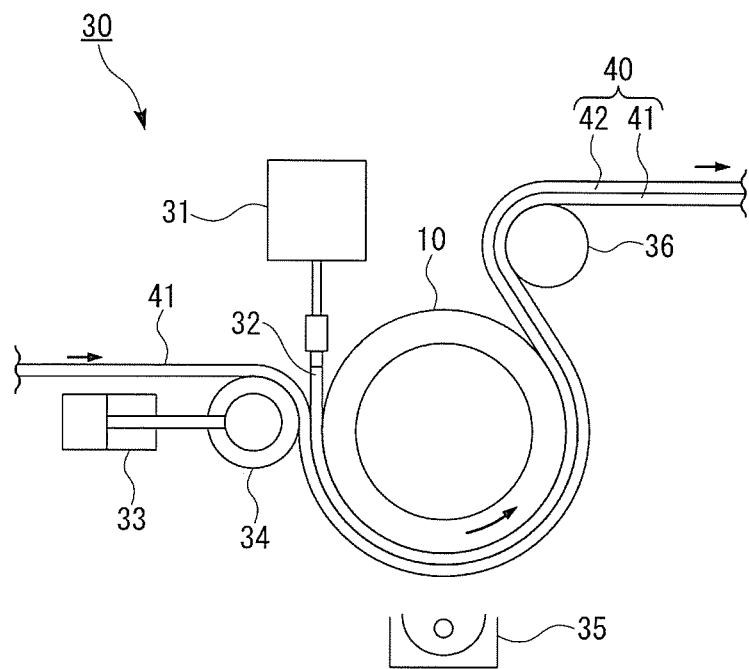
FIG. 3 is a schematic structure view of an example of a manufacturing apparatus for a product having a concave-convex microstructure on its surface. The manufacturing apparatus includes the roll-shaped mold obtained by the invention.

The product having a concave-convex microstructure on its surface is manufactured by, for example, using a manufacturing apparatus 30 shown in FIG. 3.

An active energy ray-curable resin composition 32 is supplied from a tank 31 to between the roll-shaped mold 10 having a concave-convex microstructure (illustration omitted) on its surface and a belt-shaped film 41 (transparent substrate) moving along the surface of the roll-shaped mold 10.

The film 41 and the active energy ray-curable resin composition 32 are nipped between the roll-shaped mold 10 and a nip roll 34 with nip pressure adjusted by a pneumatic cylinder 33 so that the active energy ray-curable resin composition 32 is filled into the recessed portions in the concave-convex microstructure of the roll-shaped mold 10 while being uniformly dispersed between the film 41 and the roll-shaped mold 10.

By irradiating the active energy ray-curable resin composition 32 with an active energy ray through the film 41 from an active energy ray-irradiation apparatus 35 disposed under the roll-shaped mold 10, the active energy ray-curable resin composition 32 is cured, thereby forming a cured resin layer 42 on which the concave-convex microstructure on the surface of the roll-shaped mold 10 is transferred.

Figure 4:
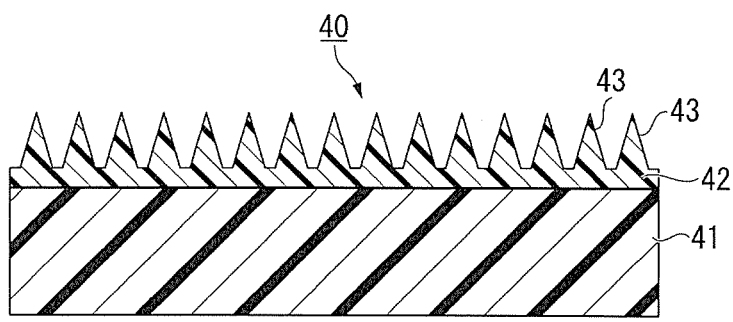
FIG. 4 is a cross-sectional view of an example of a product having a concave-convex microstructure on its surface obtained by the invention.

By separating the film 41 having the cured resin layer 42 formed on its surface from the roll-shaped mold 10 using a separating roll 36, a product 40 as shown in FIG. 4 is obtained.

Examples of the active energy ray-irradiation apparatus 35 include a high-pressure mercury lamp, a metal-halide lamp and so on.

An irradiation amount of the active energy ray is satisfactory as long as it is an amount of energy sufficient for curing of the active energy ray-curable resin composition, and is usually around 100 mJ/cm$^2$ to 10000 mJ/cm$^2$.

<Product>

The product 40 shown in FIG. 4 is obtained by forming the cured resin layer 42 on the surface of the film 41 (transparent substrate).

The cured resin layer 42 is a film containing a cured article of the active energy ray-curable resin composition, and has the concave-convex microstructure on its surface.

The concave-convex microstructure on the surface of the product 40 is formed by, for example, transferring the concave-convex microstructure on the surface of an oxide film, and includes a plurality of protruding portions 43 formed of the cured article of the active energy ray-curable resin composition.

The concave-convex microstructure is preferably a so-called moth-eye structure formed by arranging a plurality of protrusions (protruding portions) having a substantially conical shape, a pyramid shape and so on. It is known that the moth-eye structure, in which the spacing between the protrusions is equal to or less than a visible light wavelength, becomes an effective antireflection means through the continuous increase of its refractive index from the refractive index of air to the refractive index of a material.

Products manufactured according to the invention exhibit various functions such as antireflection function, water-repellent function and so on by the concave-convex microstructure on their surfaces.

In cases where the product having a concave-convex microstructure on its surface is sheet-shaped or film-shaped, it may be used as an antireflection film by, for example, being stuck to a surface of an object such as an image display apparatus (display of a television or mobile phone, etc.), an exhibition panel, a meter panel and so on, or being insert-molded. In addition, it may also be used as a member of an object at risk of exposure to rain, water, vapor and so on, such as a window or mirror in a bathroom, a solar cell member, a car mirror, a signboard, a lens of glasses and so on, so as to exhibit the water-repellent function.

In cases where the product having a concave-convex microstructure on its surface has a three-dimensional shape, a transparent substrate having a shape corresponding to its use may be used for manufacturing an antireflective product, which may be used as a member for constituting a surface of the above-mentioned object.

In addition, in the cases where the object is an image display apparatus, the product having a concave-convex microstructure on its surface may also be stuck to, not only the surface of the object, but also a front panel thereof. The front panel itself may also be constituted by the product having a concave-convex microstructure on its surface. For example, the product having a concave-convex microstructure on its surface may be applied to a surface of a rod lens array installed in a sensor array that reads an image, a cover glass of an image sensor of a fax, a photocopier or a scanner, a contact glass of a photocopier for placing an original copy thereon, and so on. In addition, the product having a concave-convex microstructure on its surface may also be applied to a light receiving section or the like of an optical communication equipment for visible light communication and so on, so as to enhance signal reception sensitivity.

In addition to the above, the product having a concave-convex microstructure on its surface may also be capable of developing for optical uses as a light guide, a relief hologram, an optical lens, a polarization separating element and so on, or for use as a cell culture sheet.

<Effects>

In the above-described method of manufacturing a product having a concave-convex microstructure on its surface of the invention, a roll-shaped mold obtained by, among the methods of manufacturing a roll-shaped mold of the invention, the method of manufacturing a roll-shaped mold that includes the concave-convex microstructure forming step (main body manufacturing step) is adopted. Accordingly, the pattern of a stain is not transferred and a high-quality product may be obtained. In addition, the surface of the roll-shaped mold is surface-treated with the lubrication treatment agent, and thus has excellent mold releasability. Therefore, the product having a concave-convex microstructure on its surface may be manufactured with good productivity.

EMBODIMENTS

In the following, the invention is described in specific detail with reference to embodiments. Nonetheless, the invention is not limited to these embodiments.

Various methods of measurement and evaluation are as follows.

<Measurement and Evaluation>

(1) Measurement of Pores on the Roll-Shaped Mold

A Pt evaporation was performed on a portion of a longitudinal section of a roll-shaped mold containing porous anodized alumina for 1 minute, and an observation was conducted by means of a field emission scanning electron microscope ("JSM-7400F" manufactured by JEOL Ltd.) at an acceleration voltage of 3.00 kV, so as to measure spacings (cycles) between adjacent pores and pore depths. Specifically, the measurements were each performed at 10 points, and the average value was regarded as a measured value.

(2) Evaluation of Formation of Stains

A surface of the roll-shaped mold was irradiated with a light emitting diode (LED) light (manufactured by Nichia Corporation; equipped with an LED with a power of 1.5 W), and places of stains formation and states of the stains were confirmed by eyes. Moreover, the states of the stains were determined by means of irradiation with the light, and according to interference fringes caused by thickness unevenness of a coating layer of the fluorine-based resin or phosphate compound.

Embodiment 1-1

The roll-shaped mold was manufactured in the following manner. Moreover, a roll-shaped aluminum substrate (purity: 99.99%; diameter: 200 mm; overall length: 320 mm) was prepared as a mold substrate.

(Main Body Manufacturing Step)

Step (a):

The aluminum substrate was anodized in a 0.3 M oxalic acid aqueous solution for 30 minutes under conditions of a direct current of 40 V and a temperature of 16° C.

Step (b):

The aluminum plate having an oxide film formed thereon was immersed into a mixed aqueous solution of 6 mass % phosphoric acid/1.8 mass % chromic acid for 6 hours, so as to remove the oxide film.

Step (c):

The aluminum substrate was anodized in the 0.3 M oxalic acid aqueous solution for 30 seconds under the conditions of a direct current of 40 V and a temperature of 16° C.

Step (d):

The aluminum substrate having an oxide film foamed thereon was immersed into an aqueous solution of 5 mass % phosphoric acid for 8 minutes to perform a pore diameter expanding treatment.

Step (e):

The steps (c) and (d) were repeated 4 times in total with the step (d) as the last step, thereby obtaining a roll-shaped mold main body having anodized alumina formed on its surface, wherein the anodized alumina has substantially conical shaped pores (recessed portions) having an average spacing of 100 nm and depth of 180 nm.

(Surface Treatment Step)

The mold main body obtained in the main body manufacturing step was cleaned with pure water to be adjusted to a state with no stain or foreign substance adhered to its surface. The mold main body was surface-treated in the following manner using the surface treatment apparatus 20 shown in FIG. 1.

Moreover, as the lubrication treatment agent 21, a fluororesin-based lubrication treatment agent obtained by diluting "Optool DSX" manufactured by Daikin Industries, Ltd. to 200 times with the diluent "Optool HD-ZV" manufactured by Daikin Industries, Ltd. was used. In addition, one provided with an outer tank (illustration omitted) adjacent to a periphery was used as the treatment tank 22.

First, the shafts 26a and 26b were installed onto two ends of the mold main body 11 via the installation members 27a and 27b, and the inclination angle of the mold main body 11 was adjusted to 5° (i.e. the central axis of the mold main body 11 was inclined by 5° from a horizontal state). Then, the shafts 26a and 26b were installed onto the support members 23a and 23b of which the heights had been adjusted in advance, thereby setting the mold main body 11 on the inclination mechanism 23. At this moment, the lubrication treatment agent 21 was not supplied in the treatment tank 22.

Next, the lubrication treatment agent 21 having a liquid temperature adjusted to 20° C. by a temperature adjustment mechanism (illustration omitted) including a constant temperature bath and a heat exchanger was supplied to the outer tank. The lubrication treatment agent 21 was supplied from the outer tank to the treatment tank 22 using a circulator pump (magnetic pump "MD-55R-M" manufactured by Iwaki Co., Ltd.), and was supplied from the bottom of the treatment tank 22, thereby immersing the mold main body 11 into the lubrication treatment agent 21 for 10 minutes (immersing step).

In addition, when the lubrication treatment agent 21 was supplied from the outer tank, the lubrication treatment agent 21 was filtered via a filter (PES membrane cartridge filter "TCS-E020-S1FE" manufactured by ADVANTEC Co., Ltd.), and then supplied to the treatment tank 22.

In addition, the lubrication treatment agent 21 overflowed from the treatment tank 22 to the outer tank, thereby removing the foreign substances floating on the liquid level in the treatment tank 22. The lubrication treatment agent 21 overflowing to the outer tank was filtered via the filter and then supplied again to the treatment tank 22, so that the lubrication treatment agent 21 was circulated between the outer tank and the treatment tank 22.

After that, the circulation of the lubrication treatment agent 21 was stopped. The valve 28 disposed at the bottom of the treatment tank 22 was opened, and the lubrication treatment agent 21 was drawn out by means of the liquid drawing means 24 by natural head liquid drawing, thus removing the mold main body 11 from the lubrication treatment agent 21 (the first removing step to the third removing step), and by which the mold main body 11 was surface-treated. At this moment, within 30 seconds from a start of the liquid drawing operation, the opening degree of the valve 28 was adjusted in a manner in which an average value of the relative movement speed of the mold main body 11 to the liquid level of the lubrication treatment agent 21 would become 0.067 mm/s. The relative movement speed is a speed at which the mold main body 11 may be removed from the lubrication treatment agent 21 in a state in which a meniscus is sustained between the surface of the mold main body 11 and the liquid level of the lubrication treatment agent 21.

Moreover, a needle valve was used as the valve 28. Flexible piping manufactured by SUS was used as the liquid drawing means 24.

After being removed from the lubrication treatment agent, the mold main body 11 was dried through natural volatilization, thus obtaining a surface-treated roll-shaped mold.

An evaluation on the formation of stains was conducted on the obtained roll-shaped mold. Results thereof are shown in Table 1.

Embodiment 1-2

A roll-shaped mold was manufactured in the same manner as in Embodiment 1-1 except that the inclination angle of the mold main body 11 was changed to 3°, and then was subjected to the evaluation on the formation of stains. Results thereof are shown in Table 1.

Embodiment 1-3

A roll-shaped mold was manufactured in the same manner as in Embodiment 1-1 except that the inclination angle of the mold main body 11 was changed to 1°, and then was subjected to the evaluation on the formation of stains. Results thereof are shown in Table 1.

Comparative Example 1-1

A roll-shaped mold was manufactured in the same manner as in Embodiment 1-1 except that the mold main body 11 was not inclined (i.e. the inclination angle of the mold main body 11 was equal to 0°), and then was subjected to the evaluation on the formation of stains. Results thereof are shown in Table 1.

Comparative Example 1-2

A roll-shaped mold was manufactured in the same manner as in Embodiment 1-1 except that the inclination angle of the mold main body 11 was changed to 0.5°, and then was subjected to the evaluation on the formation of stains. Results thereof are shown in Table 1.

Comparative Example 1-3

A roll-shaped mold was manufactured in the same manner as in Embodiment 1-1 except that the inclination angle of the mold main body 11 was changed to 1° and the average value of the relative movement speed was changed to 10 mm/s, and then was subjected to the evaluation on the formation of stains. Results thereof are shown in Table 1.

Moreover, the relative movement speed is a speed at which the mold main body 11 is removed from the lubrication treatment agent 21 in a state in which a meniscus is not sustained between the surface of the mold main body 11 and the liquid level of the lubrication treatment agent 21.

TABLE 1

| | Relative movement speed of mold main body to liquid level of fluororesin-based lubrication treatment agent [mm/s] | Sustenance of meniscus | Inclination angle of mold main body [°] | Evaluation on formation of stains |
|---|---|---|---|---|
| Embodiment 1-1 | 0.067 | Yes | 5 | Occurred at one place on the end of the mold |
| Embodiment 1-2 | 0.067 | Yes | 3 | Formed at one place on the end of the mold |
| Embodiment 1-3 | 0.067 | Yes | 1 | Formed at one place on the end of the mold |
| Comparative Example 1-1 | 0.067 | Yes | 0 | One stain formed in a stripe shape |
| Comparative Example 1-2 | 0.067 | Yes | 0.5 | A stripe-shaped stain formed at the transfer part |
| Comparative Example 1-3 | 10 | No | 1 | A plurality of stains formed irregularly on the entire surface of the mold |

Embodiment 2-1

A phosphate compound ("TDP8" manufactured by Nikko Chemicals Co., Ltd.) was dissolved in pure water to obtain an aqueous solution of which the concentration of the phosphate compound is 0.1 mass % (phosphate-based lubrication treatment agent), which was used as the lubrication treatment agent 21. In addition, the inclination angle of the mold main body 11 was changed to 2°, and the average value of the relative movement speed was changed to 0.0046 mm/s Except for the above, a roll-shaped mold was manufactured in the same manner as in Embodiment 1-1, and then was subjected to the evaluation on the formation of stains. Results thereof are shown in Table 2.

Comparative Example 2-1

A phosphate compound ("TDP8" manufactured by Nikko Chemicals Co., Ltd.) was dissolved in pure water to obtain an aqueous solution of which the concentration of the phosphate compound is 0.1 mass % (phosphate-based lubrication treatment agent), which was used as the lubrication treatment agent 21. In addition, the inclination angle of the mold main body 11 was changed to 1°, and the average value of the relative movement speed was changed to 0.0046 mm/s Except for the above, a roll-shaped mold was manufactured in the same manner as in Embodiment 1-1, and then was subjected to the evaluation on the formation of stains. Results thereof are shown in Table 2.

Comparative Example 2-2

A phosphate compound ("TDP8" manufactured by Nikko Chemicals Co., Ltd.) was dissolved in pure water to obtain an aqueous solution of which the concentration of the phosphate compound is 0.1 mass % (phosphate-based lubrication treatment agent), which was used as the lubrication treatment agent 21. In addition, the inclination angle of the mold main body 11 was changed to 0°, and the average value of the relative movement speed was changed to 0.0046 mm/s Except for the above, a roll-shaped mold was manufactured in the same manner as in Embodiment 1-1, and then was subjected to the evaluation on the occurrence of stains. Results thereof are shown in Table 2.

Comparative Example 2-3

A phosphate compound ("TDP8" manufactured by Nikko Chemicals Co., Ltd.) was dissolved in pure water to obtain an aqueous solution of which the concentration of the phosphate compound is 0.1 mass % (phosphate-based lubrication treatment agent), which was used as the lubrication treatment agent 21. In addition, the inclination angle of the mold main body 11 was changed to 2°, and the average value of the relative movement speed was changed to 0.067 mm/s Except for the above, a roll-shaped mold was manufactured in the same manner as in Embodiment 1-1, and then was subjected to the evaluation on the formation of stains. Results thereof are shown in Table 2.

Moreover, the relative movement speed is a speed at which the mold main body 11 is removed from the lubrication treatment agent 21 in the state in which a meniscus is not sustained between the surface of the mold main body 11 and the liquid level of the lubrication treatment agent 21.

TABLE 2

| | Relative movement speed of mold main body to liquid level of phosphate-based lubrication treatment agent [mm/s] | Sustenance of meniscus | Inclination angle of mold main body [°] | Evaluation on formation of stains |
|---|---|---|---|---|
| Embodiment 2-1 | 0.0046 | Yes | 2 | Formed at one place on the end of the mold |
| Comparative Example 2-1 | 0.0046 | Yes | 1 | A stripe-shaped stain formed at the transfer part |
| Comparative Example 2-2 | 0.0046 | Yes | 0 | One stain formed in a stripe shape |
| Comparative Example 2-3 | 0.067 | No | 2 | A plurality of stains formed irregularly on the entire surface of the mold |

The roll-shaped mold obtained in Embodiments 1-1 to 1-3 and 2-1 was as shown in FIG. 2. Although a stain formed at one place on the surface (non-transfer part 12) of the end, the formation of the stain at the transfer part 13 was prevented. In the cases of Embodiments 1-1 to 1-3 and 2-1, the stain was not formed at the end of the mold used for transfer, and thus did not affect the transfer operation.

Figure 5:
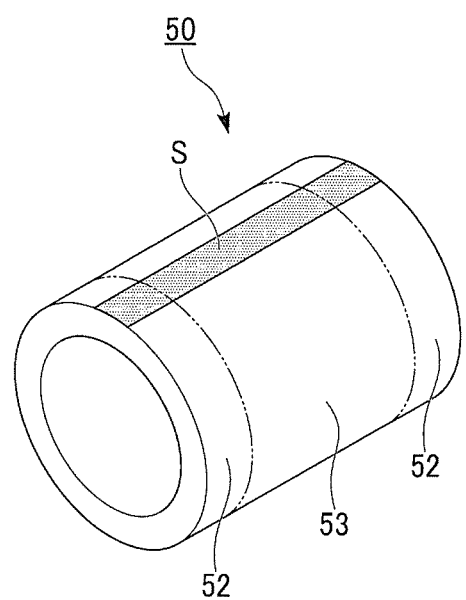
FIG. 5 schematically illustrates a three-dimensional view of an example of a roll-shaped mold obtained by the prior art after a surface treatment.

Meanwhile, on the roll-shaped mold obtained in Comparative Examples 1-1 and 2-2 in which the mold main body was removed from the lubrication treatment agent in the state in which the mold main body was not inclined, as shown in FIG. 5, one stain formed in a stripe shape on the surface, and the stain also formed at the transfer part 53 for transfer.

In the case of Comparative Example 1-2 in which an organic solvent liquor (fluororesin-based lubrication treatment agent) was used as the lubrication treatment agent and the mold main body was removed from the lubrication treatment agent with the inclination angle of the mold main body set to 0.5°, a stripe-shaped stain formed at the transfer part.

In addition, in the case of Comparative Example 2-1 in which an aqueous solution (phosphate-based lubrication treatment agent) was used as the lubrication treatment agent and the mold main body was removed from the lubrication treatment agent with the inclination angle of the mold main body set to 1°, a stripe-shaped stain formed at the transfer part.

In the cases of Comparative Examples 1-3 and 2-3 in which the mold main body was removed from the lubrication treatment agent in the state in which a meniscus is not sustained between the surface of the mold main body and the liquid level of the lubrication treatment agent, a liquid having an amount by which liquid dripping of the lubrication treatment agent can be confirmed remained on the entire surface of the mold main body right after the removal. On the roll-shaped mold obtained in Comparative Examples 1-3 and 2-3, irregular stains resulting from the generation of the remaining droplets due to breakup of the meniscus formed on the entire surface of the mold.

INDUSTRIAL USABILITY

The roll-shaped mold obtained by the method of manufacturing a roll-shaped mold of the invention is useful as a mold for manufacturing the product having a concave-convex microstructure on its surface using the imprint method in a roll-to-roll manner.

What is claimed is:

1. A method of manufacturing a roll-shaped mold, wherein the roll-shaped mold has a surface of a roll-shaped mold main body treated with a treatment agent, the method comprising:
    an immersing step of immersing the mold main body into the treatment agent;
    a first removing step of exposing a portion of the mold main body from a liquid level of the treatment agent in a first state in which a central axis of the mold main body is inclined with respect to a horizontal surface;
    a second removing step in which the mold main body is moved in relation to the liquid level of the treatment agent in a second state in which a meniscus is sustained between the exposed portion of the mold main body and the liquid level of the treatment agent and thereby further exposing the mold main body from the liquid level of the treatment agent; and
    a third removing step of removing an entire mold main body from the treatment agent in the first state in which the central axis of the mold main body is inclined with respect to the horizontal surface,
    wherein the treatment agent is an organic solvent liquor, and in the third removing step, the central axis of the mold main body is inclined at 0.6° or more with respect to the horizontal surface.

2. A method of manufacturing a roll-shaped mold, wherein the roll-shaped mold has a surface of a roll-shaped mold main body treated with a treatment agent, the method comprising:
    an immersing step of immersing the mold main body into the treatment agent;
    a first removing step of exposing a portion of the mold main body from a liquid level of the treatment agent in a first state in which a central axis of the mold main body is inclined with respect to a horizontal surface;
    a second removing step in which the mold main body is moved in relation to the liquid level of the treatment agent in a second state in which a meniscus is sustained between the exposed portion of the mold main body and the liquid level of the treatment agent and thereby further exposing the mold main body from the liquid level of the treatment agent; and
    a third removing step of removing an entire mold main body from the treatment agent in the first state in which the central axis of the mold main body is inclined with respect to the horizontal surface,
    wherein the treatment agent is an aqueous solution, and in the third removing step, the central axis of the mold main body is inclined at 2° or more with respect to the horizontal surface.

3. The method of manufacturing a roll-shaped mold according to claim 1, wherein in the first removing step, the second removing step and the third removing step, the central axis of the mold main body is inclined with respect to the horizontal surface.

4. The method of manufacturing a roll-shaped mold according to claim 1, before the immersing step, further comprising a concave-convex microstructure forming step of forming a concave-convex microstructure on the surface of the mold main body.

5. The method of manufacturing a roll-shaped mold according to claim 4, wherein the concave-convex microstructure is formed by an anodization treatment.

6. A method of manufacturing a product having a concave-convex microstructure on a surface of the product, comprising a transfer step of transferring a concave-convex microstructure on a surface of the roll-shaped mold obtained by the method of manufacturing a roll-shaped mold according to claim 5 onto a surface of a main body of the product.

7. The method of manufacturing a roll-shaped mold according to claim 2, wherein in the first removing step, the second removing step and the third removing step, the central axis of the mold main body is inclined with respect to the horizontal surface.

8. The method of manufacturing a roll-shaped mold according to claim 2, before the immersing step, further comprising a concave-convex microstructure forming step of forming a concave-convex microstructure on the surface of the mold main body.

9. The method of manufacturing a roll-shaped mold according to claim 8, wherein the concave-convex microstructure is formed by an anodization treatment.

10. A method of manufacturing a product having a concave-convex microstructure on a surface of the product, comprising a transfer step of transferring a concave-convex microstructure on a surface of the roll-shaped mold obtained by the method of manufacturing a roll-shaped mold according to claim 9 onto a surface of a main body of the product.

* * * * *